United States Patent [19]

Muller et al.

[11] 3,856,703

[45] Dec. 24, 1974

[54] INTERESTERIFICATION CATALYSTS CONSISTING OF AN ALKALI METAL DISPERSED IN A NEUTRALIZED AND SATURATED FAT

[75] Inventors: Johannes Jacobus Muller, Rotterdam; Theodorus Joannes Kock, Heenvliet, both of Netherlands

[73] Assignee: Lever Brothers Company, New York, N.Y.

[22] Filed: May 31, 1973

[21] Appl. No.: 365,659

[30] Foreign Application Priority Data
June 2, 1972  Great Britain .................... 25841/72

[52] U.S. Cl.............. 252/430, 260/398, 260/410.7, 260/420
[51] Int. Cl............................................. B01j 11/00
[58] Field of Search ......... 252/430; 260/398, 410.7, 260/420

[56] References Cited
UNITED STATES PATENTS

| | | | |
|---|---|---|---|
| 1,151,718 | 8/1915 | Richardson ........................ | 252/430 |
| 1,226,620 | 5/1917 | Ellis .................................... | 252/430 |
| 2,609,346 | 9/1952 | Faulkner ............................ | 252/430 |
| 2,758,096 | 8/1956 | Hill ................................ | 252/430 X |
| 3,097,247 | 7/1963 | Puckett ........................... | 252/430 X |

Primary Examiner—Daniel E. Wyman
Assistant Examiner—Paul F. Shaver
Attorney, Agent, or Firm—Louis F. Kline, Jr.

[57] ABSTRACT

The specification describes interesterification catalysts, consisting of particles of alkali metal dispersed in substantially solid fat of a melting point of 25°–40°C, particularly hydrogenated coconut fat of a melting point of 28°–35°C.

7 Claims, No Drawings

INTERESTERIFICATION CATALYSTS CONSISTING OF AN ALKALI METAL DISPERSED IN A NEUTRALIZED AND SATURATED FAT

The present invention relates to interesterification catalysts and to processes for their preparation.

The invention also relates to a process for effecting catalytic interesterification of glycerides, especially triglycerides, using the catalysts of the invention.

In catalytic interesterification the fatty acid radicals present in the glycerides, which fatty acids generally differ both in number of carbon atoms and in degree of unsaturation, are rearranged and consequently the melting point, the dilatometric characteristics and other properties of the mixture of glycerides formed differ from those properties of the starting glyceride mixture.

By "interesterification" is meant the interchange of the fatty acid radicals of the glycerides on the glyceryl radicals in random fashion. This interchange continues dynamically when the oil is in liquid state until the mixture of molecular configurations reaches an equilibrium in accordance with the laws of probability. The term "molecular configuration" refers to the identity of the fatty acid radicals combined with the glyceryl radical.

Interesterification reactions can be carried out under conditions of temperature at which the entire mixture of glycerides is liquid (generally called 'random interesterification') or partly crystallized (generally called 'directed interesterification'). In the latter type of interesterification reaction the equilibrium in the liquid reaction medium will be disturbed when solid glycerides crystallize until a new equilibrium under the existing temperature conditions has been reached in said liquid medium.

In the interesterification of glycerides, such as vegetable and animal oils and fats, it is customary to use an alkali metal as catalyst, in a quantity of up to at most 0.3% by weight of the glyceride mixture. Such alkali metals are difficult to handle; for instance, if the catalyst is exposed to moist air self-ignition can take place and in contact with the human skin burning of the skin can occur.

Up to now such interesterification catalysts were mainly used as such or as a dispersion in a protective medium which was indifferent in respect of the catalyst, for instance, in paraffine or xylene. Owing to the presence of the protective medium in the mixture to be interesterified, contamination of the triglycerides took place. If the catalyst was used as such, dosing and/or dispersing of the catalyst required special care.

It was regarded to be highly unlikely that a high percentage of an alkali metal could be dispersed in a liquefied fat, because a fat has always been regarded to be highly reactive in respect to alkali metals.

The present invention, however, provides an interesterification catalyst comprising particles of an alkali metal dispersed in a substantially completely saturated solid fat of a melting point of 25°–40°C. This catalyst can be stored for weeks at ambient temperature without decreasing significantly in catalytic activity.

Fats of a melting point above 40°C have proved to be inadequate as carrier materials, since in the preparation of dispersions of alkali metals in these fats the alkali metals would be subjected to too high temperatures for too long a period of time, and as a consequence self-ignition can take place; fats of a melting point below 25°C are not suitable because of their unacceptable degree of unsaturation or their insufficient ability to have the catalyst homogeneously dispersed throughout the range of normally occurring use temperatures.

It is essential that the fat used is substantially completely saturated and solid, otherwise polymerization and darkening of the fat will readily set in, probably on account of the presence of double bonds in the fatty acid radicals.

Suitable alkali metals to be dispersed in fat are potassium and particularly sodium.

Although these alkali metals are generally called "catalysts" or "low temperature catalysts," the nature of the true active catalyst in the interesterification reaction — which may be a reaction product formed in situ from said "catalyst" during the interesterification treatment — is not yet fully understood. In this specification by "catalysts" or "low temperature catalysts" is to be understood the alkali metal from which said unknown catalytic agent can or will be formed in situ during the interesterification process.

Suitable fats in which the particles of the alkali metals can be dispersed are hydrogenated lauric type fats, e.g. hydrogenated coconut oil, palm kernel oil and babassu oil, hydrogenated coconut oil of a melting point of 28° or 30° to 35°C being particularly preferred.

Preferably from 5 or 20 to 60%, particularly from 40–50% by weight of alkali metal is dispersed in fat.

The particle size of the alkali metal is critical and can cover a range of from about 0.2–1 mm of at least 90% by weight of the particles.

Outside this particle size range the dispersed alkali metal particles are not soluble or only to a limited degree, in the glyceride mixture to be interesterified and consequently no or unsufficient reactive catalytic agent can be formed from a usual quantity of alkali metal.

It is convenient that the catalyst of the invention is in the form of flakes in which the particles of the alkali metal are uniformly dispersed in the substantially complete saturated solid fat, but other physical forms can be used as well, e.g. noodles, granules, pellets, ribbons and so on.

The catalyst can be prepared by heating the substantially completely saturated fat of a melting point of 25°–40°C to a temperature above its melting point and dispersing the particles of catalytically active alkali metal in the heated fat and cooling the dispersion thus obtained.

Care should be taken that during the preparation the catalyst is not subjected to temperatures above 30°C for such a period of time that the activity of the fatty catalyst is significantly decreased.

Preferably the product is subjected to a temperature above 30°C for no more than 0.5 hour, particularly less than 10 minutes during the preparation.

Preferably the fatty catalyst is prepared by heating a substantially completely saturated fat of a slip melting point of 25°–40°C, particularly hardened coconut oil of a slip melting point of 28°–35°C, to a temperature above its melting point, for instance 32°–50°C in the case of coconut oil and dispersing particles of the alkali metal, especially sodium of a particle size of 0.3 to 1 mm in the heated fat and cooling the dispersion obtained to a temperature below the melting point of the fat, e.g. 5°–25°C.

The cooling of the dispersion can be effected by means of a rotating cooling drum from which flakes of the catalyst of the invention can be scraped off in an inert atmosphepre.

If the fats which are used for the purpose of the invention contain catalyst poisons (e.g. water and free fatty acids) in such proportions that a substantial proportion of the dispersed catalyst is inactivated, at least the major part of such poisons should preferably be removed before the alkali metal is dispersed therein. Such water and free acids are the principal catalyst poisons, it is preferred to carefully neutralize the fat and to reduce the water content to a level of below 0.05%, preferably below 0.015%, and in particular below 0.01% by weight before the catalyst is dispersed therein.

Although the drying step can be effected in several ways, when a deacidification process by distillation is carried out, as is usual in the edible oils industry, supplementary drying is not as a rule necessary for the purpose of the present invention. Drying may alternatively be done by treating the fat at an elevated temperature with a dry inert gas.

Prior to dispersing the catalyst in the fat, it is also preferred to deacidify the fat to an acid value or less than 0.3, preferably less than 0.1. By "acid value" is to be understood the number of milligrammes of potassium hydroxide which it takes to neutralize 1 g. of the fat. The acid value is determined by the process described by H. A. Boekenoogen, "Analysis and Characterization of oils, fats and fat products," Volume I, 1964, Interscience Publishers, London, pp. 23–24. Since this determination is carried out at ambient temperature in a short space of time, the esters are not saponified, so that an acid value of O is obtained in the absence of free acids.

Fats can be deacidified by using a process of deacidification by distillation in vacuo, but it can also be done by direct contact with an alkaline solution, by which soaps are formed which can be separated by the difference in specific gravity between the fat and the soap. Such alkali deacidification can for instance be carried out by means of an 0.2 to 8N sodium hydroxide solution.

The fatty catalyst of the invention can be used for the interesterification of glycerides. Depending on the storage time and storage conditions — probably due to the formation of a hard soap layer on the outside of the alkali metal particles — the fatty catalyst is sometimes difficult to disperse in the mixture to be interesterified. Care should be taken therefore that energetic stirring is applied, e.g. by using an "Ultra Turrax" high-speed stirrer, a colloid mill or similar device, to dissolve the alkali metal in the mixture to be interesterified.

The process according to the invention will now be illustrated by the following Examples (all percentages and parts are by weight):

EXAMPLE I 60 grams of fully hydrogenated coconut oil of a slip melting point of 31°C, an iodine value of 1.0, and an acid value of 0.1 were heated in a round bottom flask under vacuum to decrease the water content to 0.01%.

40 grams of sodium of a particle size of 0.4–0.8 mm, were separated from a xylene suspension, washed with hexane to remove the xylene, dried under vacuum and added to the heated fat of 35°C.

The mixture was stirred and the homogeneous mass obtained was rapidly cooled to a temperature of 20°C and the round bottom flask was closed by a stopper.

The sodium had been subjected to a temperature of above 30°C for about 4 minutes.

The fatty catalyst obtained was used for interesterification of a mixture of glycerides directly after preparation and 120 days later (after storage at 5°C) it was observed that the activity of the catalyst remained practically unchanged after 120 days storage.

EXAMPLE II 50 grams of fully hydrogenated coconut oil of a temperature of 50°C were mixed with 50 grams of sodium as described in Example I. Both the coconut oil and sodium were the same as used in Example I.

The fatty catalyst obtained was stored at 20°C for 80 days.

The activity of the catalyst was tested by random interesterification. After 80 days' storage of the catalyst practically no change in activity could be observed. The catalyst was dispersed in the oil to be interesterified with a high speed stirrer (Ultra Turrax).

To show the criticality of the particle size of the alkali metal particles this experiment was repeated with sodium particles of a particle size of from 10 to 20 micron. Although an excellent dispersion in fat could be prepared, the fatty catalyst obtained could not be used for interesterification purposes even after 10 days' storage at 5°C, probably on account of the formation of a completely insoluble soap layer on the sodium particles.

EXAMPLE III

Example II was repeated under identical conditions, except that the sodium was now dispersed in hydrogenated palm kernel oil of a melting point of 39°C. The catalyst obtained was still reactive after 20 days' storage.

EXAMPLE IV

Example I was repeated under identical conditions, except that 25% of sodium was not dispersed in hydrogenated coconut oil of a melting point of 30.5°C. The catalyst obtained was successfully used for interesterification of glycerides after the catalyst had been stored for 3 weeks.

EXAMPLE V

Example I was repeated except that 55% of sodium was dispersed in hydrogenated coconut oil of a melting point of 28°C. The particle size of 90% of the sodium particles was from 0.5 to 1 mm. The catalyst obtained could be used for the interesterification of triglycerides after the catalyst had been stored for about 3 weeks.

What is claimed is:

1. Interesterification catalyst essentially consisting of particles of an alkalimetal, at least 90 percent of which have a particle size of 0.3 to 1 mm, dispersed in a substantially completely saturated and substantially neutralized solid fat of a melting point of 25°–45°C and having no more than 0.05 percent by weight of water, the proportion of alkalimetal in fat being from 5–60 percent by weight.

2. Interesterification catalyst according to claim 1, in which the catalytically active alkali metal is sodium.

3. Interesterification catalyst according to claim 1 in which the fat is a hydrogenated lauric type fat.

4. Interesterification catalyst according to claim 1, in which the fatty material is coconut fat of a melting point at 28°–35°C.

5. Interesterification catalyst according to claim 1, in which the proportion of alkali metal in fat is from 20–60% by weight.

6. Interesterification catalyst according to claim 1, in which the proportion of alkali metal in fat is from 40–50% by weight.

7. Interesterification catalyst according to claim 1, in which the particles of alkali metal are uniformly dispersed in flakes of substantially completely saturated solid fat.

* * * * *